(12) United States Patent
Lee et al.

(10) Patent No.: US 11,345,475 B2
(45) Date of Patent: May 31, 2022

(54) STOWABLE CARGO GUIDE FOR CARGO ROLLER TRAYS

(71) Applicant: GOODRICH CORPORATION, Charlotte, NC (US)

(72) Inventors: Brandon Lee, Wahpeton, ND (US); Ryan Pfau, Jamestown, ND (US)

(73) Assignee: GOODRICH CORPORATION, Charlotte, NC (US)

( * ) Notice: Subject to any disclaimer, the term of this patent is extended or adjusted under 35 U.S.C. 154(b) by 183 days.

(21) Appl. No.: 16/539,782

(22) Filed: Aug. 13, 2019

(65) Prior Publication Data

US 2021/0047041 A1   Feb. 18, 2021

(51) Int. Cl.
| B60P 7/08 | (2006.01) |
| B64D 9/00 | (2006.01) |
| B60P 7/13 | (2006.01) |

(52) U.S. Cl.
CPC ............... B64D 9/003 (2013.01); B60P 7/13 (2013.01); *B64D 2009/006* (2013.01)

(58) Field of Classification Search
CPC .......... B60P 7/0892; B60P 7/13; B64D 9/003; B64D 2009/006; B64C 1/20
USPC ............................ 410/69, 77, 78, 79, 80, 94
See application file for complete search history.

(56) References Cited

U.S. PATENT DOCUMENTS

| 3,377,040 A | 4/1968 | Hansen |
| 3,759,476 A | 9/1973 | Goodwin |
| 3,986,460 A | 10/1976 | Voigt et al. |
| 4,049,286 A | 9/1977 | Francis, Jr. |
| 4,077,590 A | 3/1978 | Shorey |
| 4,331,412 A | 5/1982 | Graf |
| 4,395,172 A | 7/1983 | Hoener et al. |
| 4,457,649 A | 7/1984 | Vogg et al. |
| 4,867,622 A | 9/1989 | Brown |
| 5,000,635 A | 3/1991 | Jensen et al. |
| 5,131,606 A | 7/1992 | Nordstrom |
| 5,316,242 A | 5/1994 | Eilenstein-Wiegmann et al. |
| 5,957,406 A | 9/1999 | Nelson |
| 6,051,133 A | 4/2000 | Huber |
| 6,270,300 B1 * | 8/2001 | Huber ...................... B60P 7/13 410/80 |
| 6,413,029 B1 | 7/2002 | Kernkamp |
| 6,425,717 B1 | 7/2002 | Saggio |

(Continued)

FOREIGN PATENT DOCUMENTS

| AU | 6712381 | 8/1981 |
| DE | 102010035099 | 2/2012 |

(Continued)

OTHER PUBLICATIONS

USPTO, Notice of Allowance dated Dec. 17, 2019 in U.S. Appl. No. 15/866,241.

(Continued)

*Primary Examiner* — Stephen T Gordon
(74) *Attorney, Agent, or Firm* — Snell & Wilmer L.L.P.

(57) ABSTRACT

A stowable cargo guide may be configured to couple to a roller tray. The stowable cargo guide may comprise a guide block configured to rotate between a stowed position and a raised position. In the stowed position, the guide block may be located below a conveyance plane of the roller tray. In the raised position, the guide block may be located above the conveyance plane of the roller tray.

18 Claims, 14 Drawing Sheets

(56) References Cited

U.S. PATENT DOCUMENTS

| | | |
|---|---|---|
| 6,485,238 B2 | 11/2002 | Segura |
| 6,557,800 B2 | 5/2003 | Medina |
| 6,729,818 B1 | 5/2004 | Yee et al. |
| 6,926,481 B2 | 8/2005 | Huber |
| 7,086,517 B2 | 8/2006 | Clos |
| 7,344,013 B2 | 3/2008 | Krueger |
| 7,731,460 B2 | 6/2010 | Brown |
| 8,066,458 B2 | 11/2011 | Schulze et al. |
| 8,256,602 B2 | 9/2012 | Huber et al. |
| 8,585,334 B2 | 11/2013 | Moradians |
| 8,821,088 B2 * | 9/2014 | Roberts ............... B60P 7/0892 410/94 |
| 8,926,243 B2 | 1/2015 | Schulze |
| 8,936,419 B1 | 1/2015 | Islam |
| 9,242,730 B2 | 1/2016 | Larson et al. |
| 9,447,618 B2 | 9/2016 | Albers et al. |
| 9,932,113 B1 | 4/2018 | Larson |
| 10,106,239 B2 | 10/2018 | Woodland |
| 10,118,700 B2 | 11/2018 | Kuppan |
| 10,293,939 B2 | 5/2019 | Conejero Moreno |
| 2004/0265085 A1 | 12/2004 | Mayer |
| 2007/0086870 A1 | 4/2007 | Schulze |
| 2007/0237598 A1 | 10/2007 | Schulze |
| 2007/0253790 A1 * | 11/2007 | Boggenstall ............ B60P 7/13 410/77 |
| 2008/0310944 A1 | 12/2008 | Stegmiller |
| 2010/0143063 A1 | 6/2010 | Dugic |
| 2011/0150594 A1 | 6/2011 | Schulze |
| 2012/0037753 A1 | 2/2012 | Huber et al. |
| 2016/0001870 A1 | 1/2016 | Moradians et al. |
| 2016/0194082 A1 | 7/2016 | Himmelmann |
| 2017/0197717 A1 | 7/2017 | Trisotto |
| 2018/0222586 A1 | 8/2018 | Shivalinga |
| 2018/0273177 A1 | 9/2018 | Jayaprakash |
| 2019/0061945 A1 | 2/2019 | Quixano Mendez |
| 2019/0210728 A1 | 7/2019 | Pfau et al. |

FOREIGN PATENT DOCUMENTS

| | | |
|---|---|---|
| EP | 0881144 | 12/1998 |
| EP | 3508422 | 7/2019 |
| FR | 2918640 | 1/2009 |
| FR | 2918641 | 1/2009 |
| GB | 2436715 | 10/2007 |
| WO | 2004054876 | 7/2004 |

OTHER PUBLICATIONS

European Patent Office, European Search Report dated Jun. 26, 2020 in Application No. 19213585.3.

European Patent Office, European Search Report dated Apr. 29, 2019 in Application No. 19150916.5.

USPTO, Non-Final Office Action dated Jun. 27, 2019 in U.S. Appl. No. 15/866,241.

European Patent Office, European Search Report dated Jul. 10, 2020 in Application No. 19214487.1.

European Patent Office, European Search Report dated Jul. 21, 2020 in Application No. 19216272.5.

USPTO, Pre-Interview First Office Action dated Sep. 30, 2020 in U.S. Appl. No. 16/539,203.

USPTO, Pre-Interview First Office Action dated Sep. 30, 2020 in U.S. Appl. No. 16/539,224.

USPTO, Notice of Allowance dated Nov. 20, 2020 in U.S. Appl. No. 16/539,203.

USPTO, Notice of Allowance dated Nov. 23, 2020 in U.S. Appl. No. 16/539,224.

* cited by examiner

STOWABLE CARGO GUIDE FOR CARGO ROLLER TRAYS

FIELD

The present disclosure relates generally to cargo handling systems, and more specifically, to a stowable cargo guide, which can be mounted to a cargo system roller tray.

BACKGROUND

Cargo handling systems, such as those used by aircraft for transport of containerized cargo or pallets, also referred to as unit load devices (ULDs), typically include longitudinal trays containing transport rollers positioned along a cargo deck floor to facilitate movement of the ULDs relative to the deck floor. The cargo handling systems may include cargo guides configured to provide longitudinal guidance and/or lateral restraint of ULDs through the cargo deck. Conventional cargo handling systems are typically designed to accommodate a particular size ULD. However, it may be desirable to provide longitudinal guidance, lateral restraint, and/or vertical restraint of different size ULDs and/or of ULDs translating in varying locations along the cargo bay floor. For example, guidance and/or restraint provided along a longitudinal tray may be desirable where one or both of the longitudinal edges of the ULDs are positioned proximate the longitudinal tray.

SUMMARY

A stowable cargo guide is disclosed herein. In accordance with various embodiments, the stowable cargo guide may comprise a housing, a guide block, and a first vertical restraint. The guide block may be located in a block opening defined by the housing and may be configured to rotate relative to the housing. The first vertical restraint may be located in a first restraint opening defined by the guide block and may be configured to rotate relative to the guide block.

In various embodiments, a securement clip may be located in a clip opening defined by the guide block and may be configured to rotate relative to the guide block. In various embodiments, the stowable cargo guide may further comprise a tray base including a laterally extending protrusion configured to engage a hook end of the securement clip.

In various embodiments, the securement clip may be biased in a first circumferential direction and the first vertical restraint may be biased in a second circumferential direction opposite the first circumferential direction. In various embodiments, the guide block may be biased in the second circumferential direction, and engagement between the hook end of the securement clip and the laterally extending protrusion of the tray base may restrict rotation of the guide block in the second circumferential direction.

In various embodiments, a first restraint latch may be located in a first latch channel defined by the guide block and may be biased toward the first restraint opening. In various embodiments, a second vertical restraint may be located in a second restraint opening defined by the guide block and may be configured to rotate relative to the guide block. A second restraint latch may be located in a second latch channel defined by the guide block and may be biased toward the second restraint opening.

In various embodiments, the securement clip may be located between the first restraint opening and the second restraint opening.

A cargo handling system is also disclosed herein. In accordance with various embodiments, the cargo handling system may comprise a roller tray including a first rail, a second rail, and a roller located between the first rail and the second rail. A stowable cargo guide may be coupled to the roller tray. The stowable cargo guide may comprise a tray base located between the first rail and the second rail, a housing coupled to the second rail, and a guide block located in a block opening defined by the housing and configured to rotate relative to the housing.

In various embodiments, the guide block may be configured to rotate between a stowed position and a raised position. In the stowed position, the guide block may be located below a conveyance plane of the roller. In the raised position, the guide block may be located above the conveyance plane of the roller. In various embodiments, in the raised position, a guide face of the guide block may vertically overlap a volume defined by the first rail and the second rail of the roller tray.

In various embodiments, the stowable cargo guide may further comprise a securement clip located in a clip opening defined by the guide block and configured to rotate relative to the guide block. The tray base may include a laterally extending protrusion configured to engage a hook end of the securement clip.

In various embodiments, the stowable cargo guide may further comprise a vertical restraint located in a restraint opening defined by the guide block and configured to rotate relative to the guide block. In various embodiments, the securement clip may be biased in a first circumferential direction and the guide block may be biased in a second circumferential direction opposite the first circumferential direction. In various embodiments, the vertical restraint may be biased in the second circumferential direction.

In various embodiments, the stowable cargo guide may further comprise a restraint latch located in a latch channel defined by the guide block and biased toward the restraint opening.

In various embodiments, the stowable cargo guide may further comprise a shaft located through the guide block and the housing. In the stowed position, the shaft may be located laterally between the second rail and a guide face of the guide block. In various embodiments, the guide block may comprise a slanted surface extending from the guide face of the guide block. The slanted surface and the guide face may form an angle greater than 90°.

As disclosed herein, a cargo handling system may comprise a roller tray and a stowable cargo guide coupled to the roller tray. The roller tray may include a first rail, a second rail, and a roller located between the first rail and the second rail. The stowable cargo guide may comprise a guide block configured to rotate between a stowed position and a raised position. In the stowed position, the guide block may be located below a conveyance plane of the roller. In the raised position, the guide block may be located above the conveyance plane of the roller.

In various embodiments, the stowable cargo guide may further comprise a housing coupled to the roller tray, a vertical restraint located in a restraint opening defined by the guide block and configured to rotate relative to the guide block, and a securement clip located in a clip opening defined by the guide block and configured to rotate relative to the guide block. The guide block may be configured to rotate relative to the housing.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures.

DETAILED DESCRIPTION OF THE DRAWINGS

Figure 1:
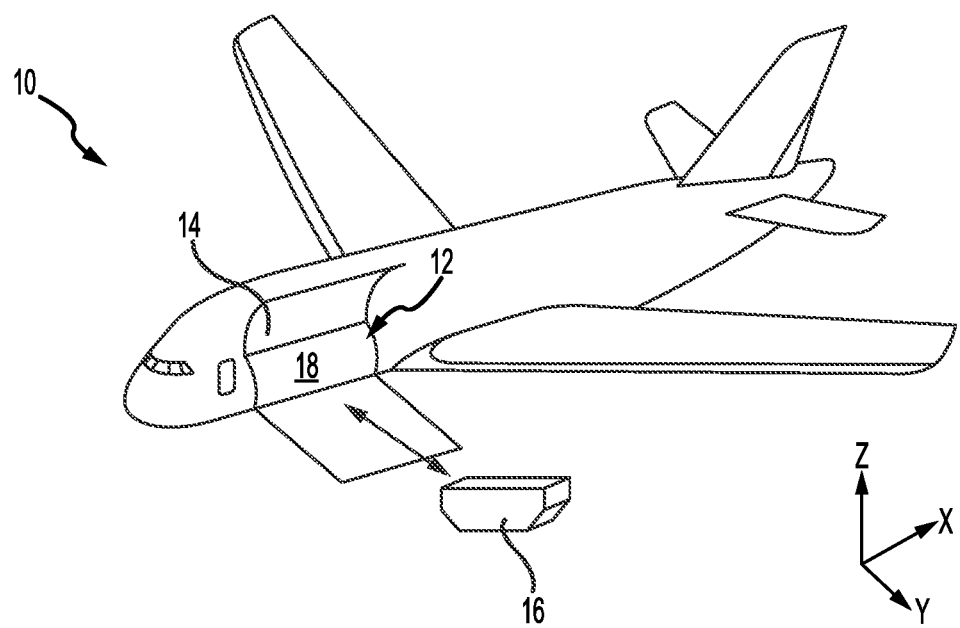
FIG. 1 illustrates an axonometric view of an aircraft being loaded with cargo, in accordance with various embodiments.

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact.

Cross hatching lines may be used throughout the figures to denote different parts but not necessarily to denote the same or different materials. Throughout the present disclosure, like reference numbers denote like elements. Accordingly, elements with like element numbering may be shown in the figures, but may not necessarily be repeated herein for the sake of clarity.

As used herein, "aft" refers to the direction associated with the tail (i.e., the back end) of an aircraft, or generally, to the direction of exhaust of a gas turbine engine. As used herein, "forward" refers to the direction associated with the nose (i.e., the front end) of an aircraft, or generally, to the direction of flight or motion.

Cargo handling systems, as disclosed herein, may comprise stowable cargo guides configured to guide and restrain the movement of ULDs or other cargo across the floor or "cargo deck" of an aircraft. In accordance with various embodiments, the stowable cargo guides may be coupled to roller trays located along the cargo deck. The stowable cargo guides are configured to be rotated between a stowed position, wherein the stowable cargo guides are located below the conveyance plane of the roller tray rollers such that the stowable cargo guides do not contact ULDs located over the roller tray, and a raised position, wherein the stowable cargo guides are located above the conveyance plane of the roller tray rollers to guide and restrain movement of ULDs. In this regard, the stowable cargo guides may be raised to guide and restrain smaller width ULDs and rotated to the stowed position so as not to interfere with the conveyance of larger width ULDs. In accordance with various embodiments, the stowable cargo guides may be located anywhere guidance and restraint of ULDs is desired. In this regard, the stowable cargo guides may be located throughout the cargo deck. During a loading event, an operator may select which stowable cargo guides to rotate the raised position based on where guidance and restraint of ULDs is desired. In this regard, the stowable cargo guides may provide restraint and guidance regardless of ULD size.

With reference to FIG. 1, an aircraft 10 is illustrated. Aircraft 10 includes a cargo compartment 12. A cargo door 14 provides access to cargo compartment 12 from outside aircraft 10. Cargo 16 (e.g., pallets or ULDs) may be loaded and unloaded through cargo door 14 and onto a cargo deck 18 of aircraft 10.

Figure 2A:
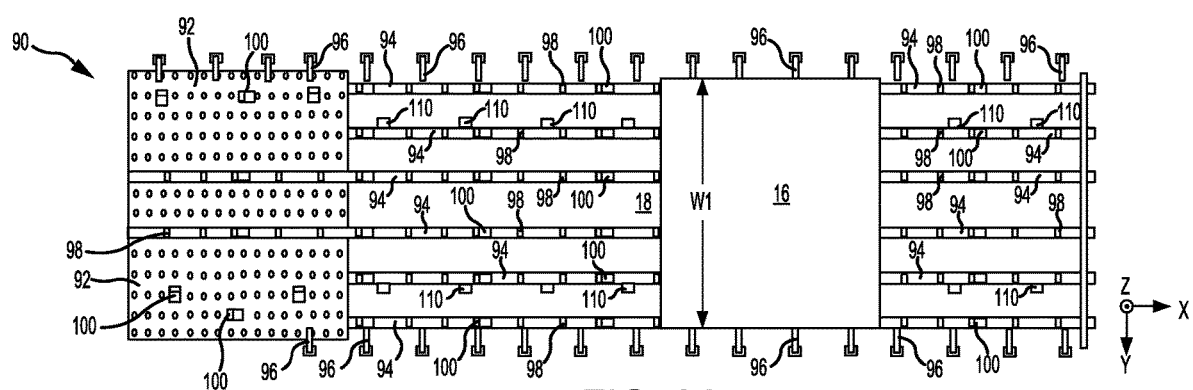
FIG. 2A illustrates a top down view of a ULD located on a cargo handling system with the stowable cargo guides of the cargo handling system in a stowed position, in accordance with various embodiments.

With reference to FIG. 2A, a cargo handling system 90 is illustrated. In accordance with various embodiments, cargo handling system 90 may be used to load, move, and unload cargo 16 from cargo deck 18. Cargo handling system 90 includes components configured to facilitate translation of cargo 16 along cargo deck 18. For example, cargo handling system 90 may include ball mats (or caster panels) 92, roller trays (or caster trays) 94, and guide rails 96. In various embodiments, ball mats 92 may be located proximate cargo door 14, with momentary reference to FIG. 1. Roller trays 94, which each include one or more rollers 98, may be oriented in a longitudinal direction. As used herein, the term "longitudinal" refers to forward and aft directions (i.e., a direction parallel to the x-axis on the provided xyz axes). In this regard, roller trays 94 may facilitate forward and aft translation of cargo 16. Cargo handling system 90 may further include one or more power drive units (PDUs) 100 configured to propel cargo 16 in a desired direction. PDUs 100 may be located in ball mats 92, roller trays 94, and/or in any other desired location along cargo deck 18. Guide rails 96 may be located along the edges of cargo deck 18. Guide rails 96 may restrict lateral and vertical translation of cargo 16. As used herein, the term "lateral" refers to directions perpendicular to the longitudinal direction (i.e., directions parallel to the y-axis on the provided xyz axes). As used herein, the term "vertical" refers to directions perpendicular to cargo deck 18 (i.e., direction perpendicular to the xy-plane and/or parallel to the z-axis on the provided xyz axes).

Cargo handling system 90 may include one or more stowable cargo guides 110. In various embodiments, stowable cargo guides 110 may be mounted to one or more of the roller trays 94. To handle cargo 16 of width W1, stowable cargo guides 110 may be positioned in a stowed position. In the stowed position, cargo 16 may translate over roller trays 94 without contacting stowable cargo guides 110.

Figure 2B:
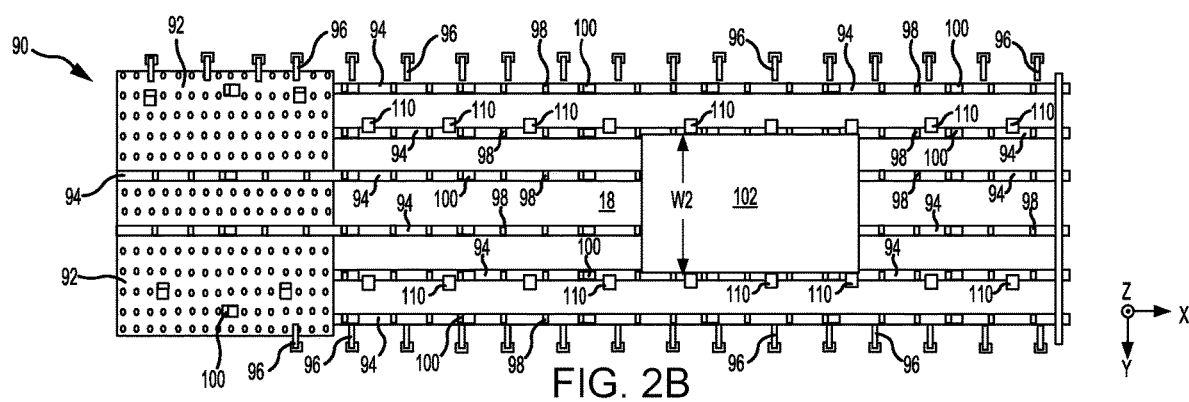
FIG. 2B illustrates a top down view of a ULD located on a cargo handling system with the stowable cargo guides of the cargo handling system in a raised position, in accordance with various embodiments.

With reference to FIG. 2B, cargo handling system 90 is shown with stowable cargo guides 110 in a raised position. In accordance with various embodiments, stowable cargo guides 110 may be rotated to a raised positioned to facilitate and control movement of cargo 102 having a width W2. In the raised position, stowable cargo guides 110 may restrict the lateral and/or vertical movement of cargo 102. With combined reference to FIGS. 2A and 2B, in accordance with various embodiments, cargo handling system 90 may include guide rails 96 to guide, restrain, and/or secure cargo 16 having width W1 and stowable cargo guides 110 to guide, restrain, and/or secure the cargo 102 having width W2 (i.e., a width less than width W1). For example, operators of cargo handling system 90 may rotate stowable cargo guides 110 to the stowed position for loading and unloading cargo having width W1 and to the raised position for loading cargo having width W2. In this regard, stowable cargo guides 110 may allow cargo handling system 90 to accommodate and support cargo of varying widths. In addition, stowable cargo guides 110 may allow cargo handling system 90 to accommodate and support cargo at varying locations (laterally) across the cargo deck 18.

Figure 2C:
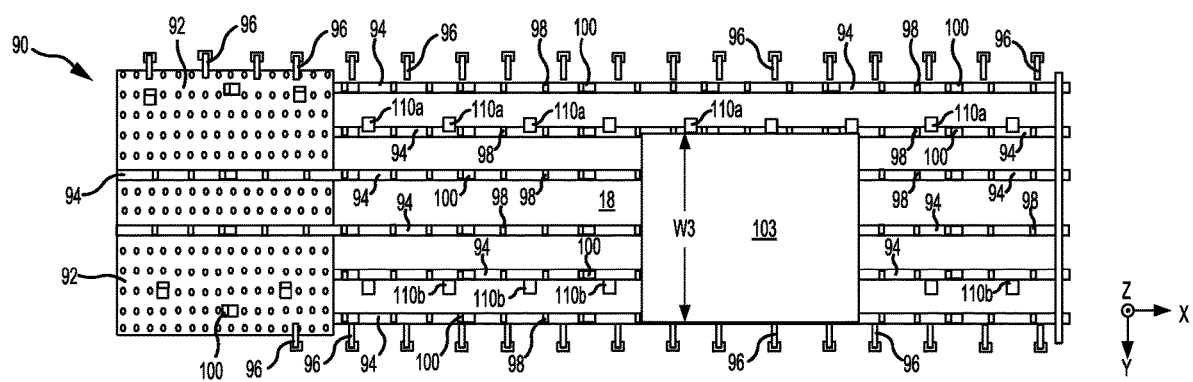
FIG. 2C illustrates a top down view of a ULD located on a cargo handling system with a first group of the stowable cargo guides of the cargo handling system in a raised position and a second group of the stowable cargo guides of the cargo handling system in a stowed position, in accordance with various embodiments.

With reference to FIG. 2C, a first group of stowable cargo guides 110a may be in the raised position to provide longitudinal guidance and lateral restraint to cargo 103 having width W3. In various embodiments, the first group of stowable cargo guides 110a may also provide vertical restraint of cargo 103. A second group of stowable cargo guides 110b may be in stowed position. In this regard, the second group of stowable cargo guides 110b may be positioned below the conveyance plane of roller trays 94, such that the second group of stowable cargo guides 110b do not contact or otherwise interfere with conveyance of cargo 103.

In accordance with various embodiments, cargo handling system 90 may include any number of stowable cargo guides 110 coupled to roller trays 94 at any desired location. Which stowable cargo guides 110 are in the raised position and which stowable cargo guides 110 are in the stowed position may be determined (e.g., by an operator) based on the width of the cargo being loaded/unloaded and/or based on where restraint and guidance is desired. For example, while stowable cargo guides 110 in FIG. 2B are depicted as raised for cargo having width W2, cargo handling system 90 may include stowable cargo guides 110, which can be raised to guide and restrain cargo of larger width (e.g., width W1 or width W3) provided that that cargo is positioned such that it needs guidance and restraint above a roller tray. In this regard, stowable cargo guides 110 are positioned to provide a cargo handling system having customizable longitudinal guidance, lateral restraint, and/or vertical restraint throughout the cargo deck.

Figure 3:
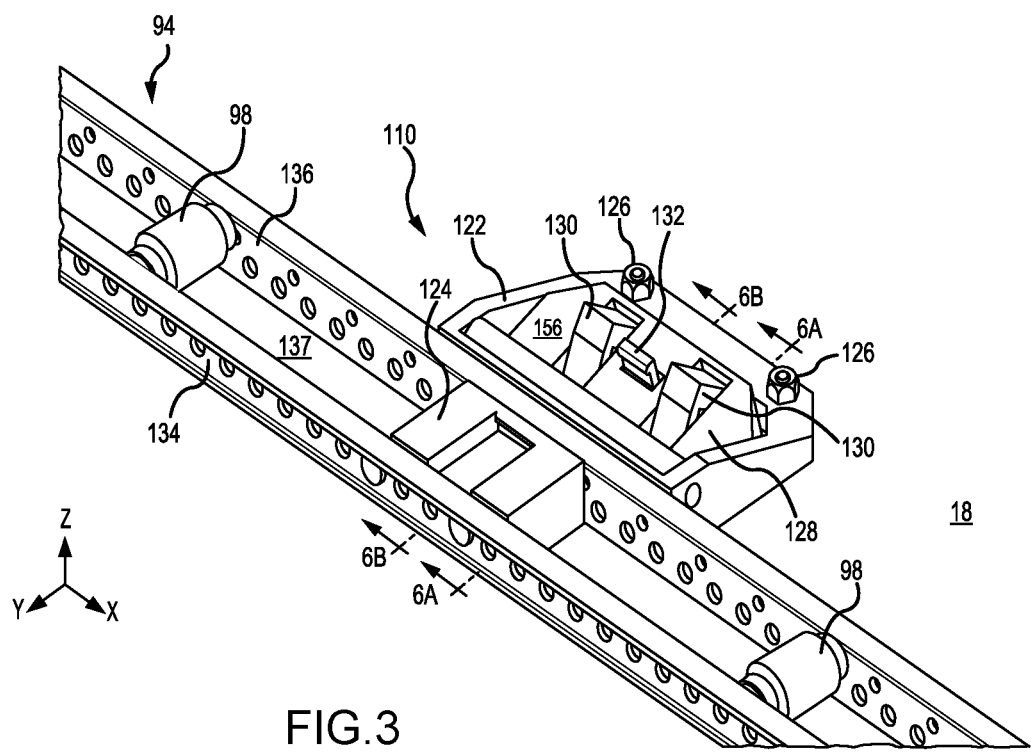
FIG. 3 illustrates an axonometric view of a stowable cargo guide mounted to a roller tray and in a stowed position, in accordance with various embodiments.

With reference to FIG. 3, a stowable cargo guide 110 of cargo handling system 90 is illustrated in the stowed position. In accordance with various embodiments, stowable cargo guide 110 includes a housing 122 and a tray base 124. Housing 122 may be coupled to cargo deck 18 via one or more fastener(s) 126. In various embodiments, and with combined reference to FIG. 6A, fasteners 126 may include a lift nut 125 in ramped engagement with a shear plunger 127. Fasteners 126 may also include a tension stud 129. Lift nut 125, shear plunger 127, and tension stud 129 may be configured to secure housing 122 to cargo deck 18. While fasteners 126 are illustrated as seat track (or floor) fitting fasteners, it is further contemplated that any suitable securement device may be employed to secure housing 122 to cargo deck 18. For example, fasteners 126 may comprise rivets, screws, clips, etc.

Figure 4:
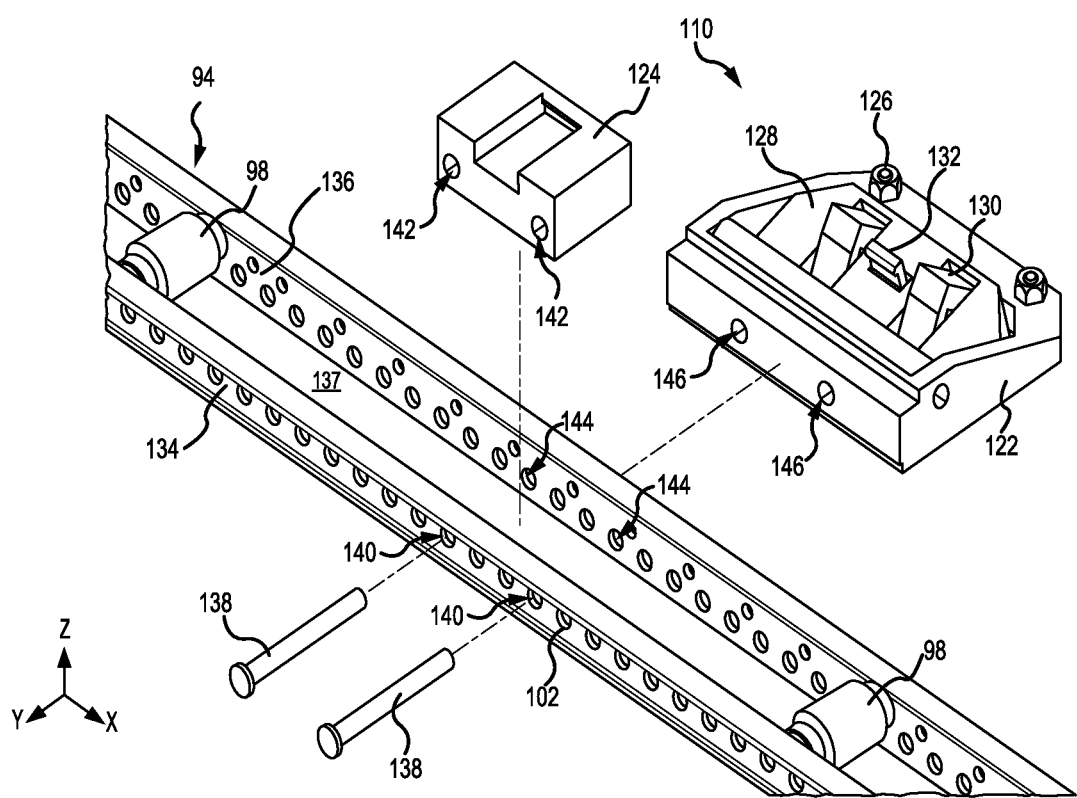
FIG. 4 illustrates an assembly view for mounting a stowable cargo guide to a roller tray, in accordance with various embodiments.

With reference to FIG. 4, and continuing reference to FIG. 3, housing 122 and tray base 124 may be secured to a roller tray 94 of cargo handling system 90. In various embodiments, tray base 124 may be located between a first rail 134 and a second rail 136 of roller tray 94. First and second rails 134, 136 may extend vertically from a floor 137 of roller tray 94. First and second rails 134, 136 and floor 137 may be oriented in the longitudinal direction. One or more rollers 98 of roller tray 94 may be located between first rail 134 and second rail 136. In various embodiments, one or more fasteners 138 may secure housing 122 and tray base 124 to first and second rails 134, 136. Fasteners 138 may comprise screws, nuts and bolts, clips, or any other suitable securement device. Fasteners 138 may extend through holes 140 defined by first rail 134, holes 142 defined by tray base 124, holes 144 defined by second rail 136, and holes 146 defined by housing 122. In various embodiments, fasteners 138 may be in threaded engagement with housing 122.

Figure 5:
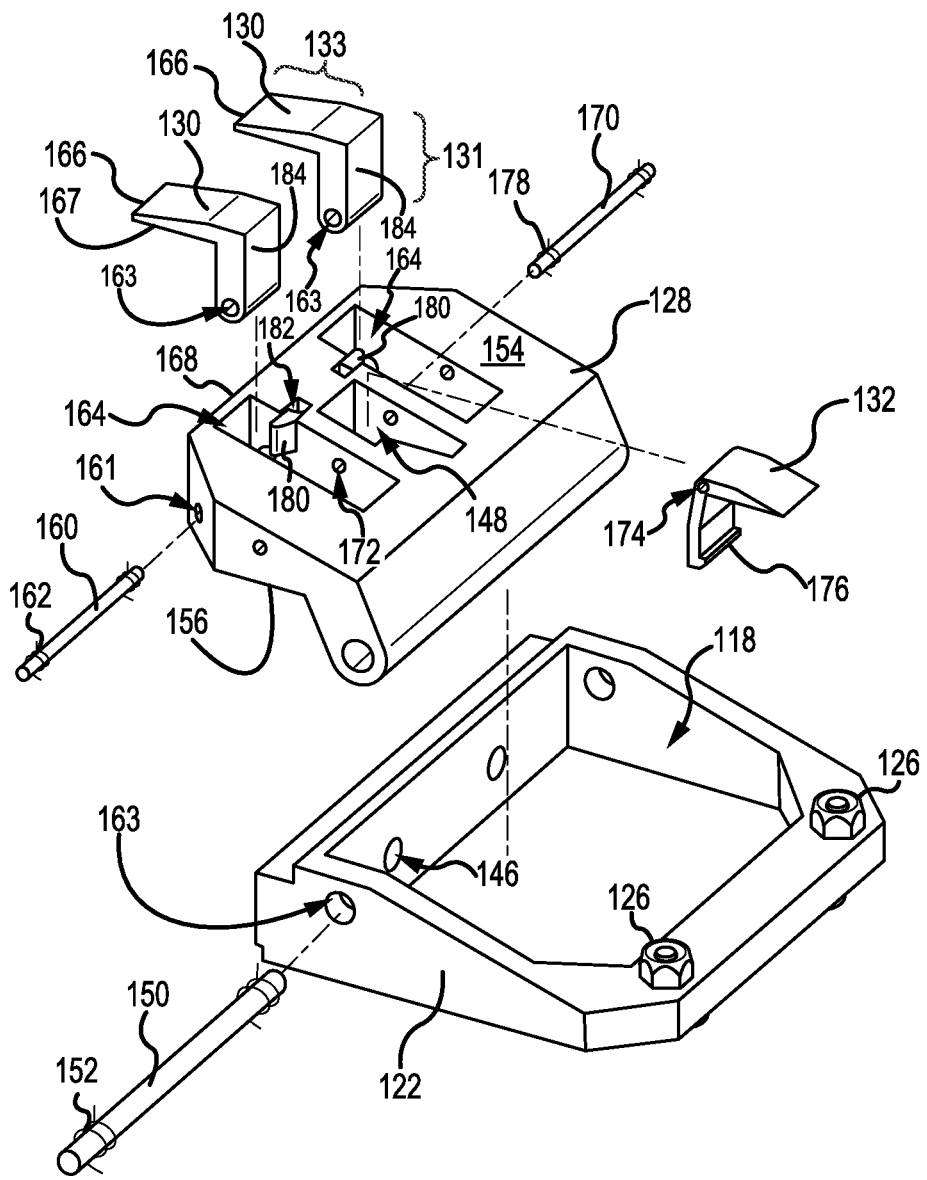
FIG. 5 illustrates an exploded view of a stowable cargo guide, in accordance with various embodiments.
Figure 6A:
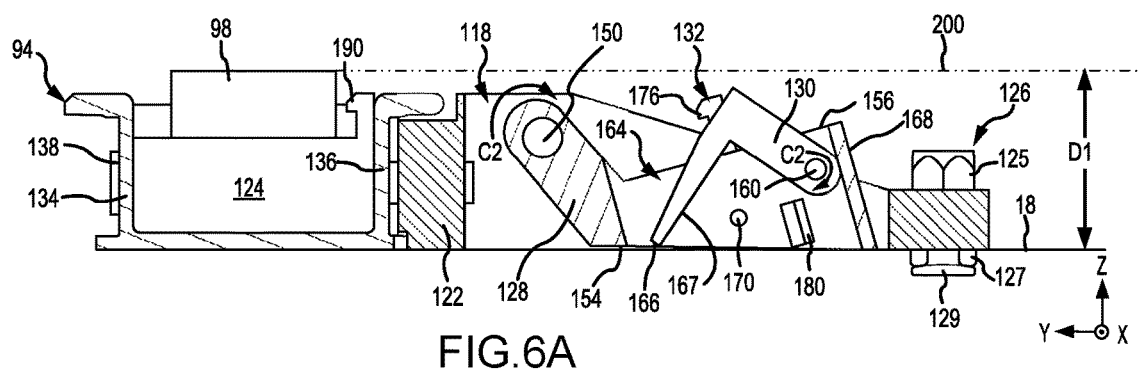
FIGS. 6A and 6B illustrate cross-section views, taken along the lines 6A-6A and 6B-6B, respectively, in FIG. 3, of a stowable cargo guide mounted to a roller tray and in a stowed position, in accordance with various embodiments.
Figure 7A:
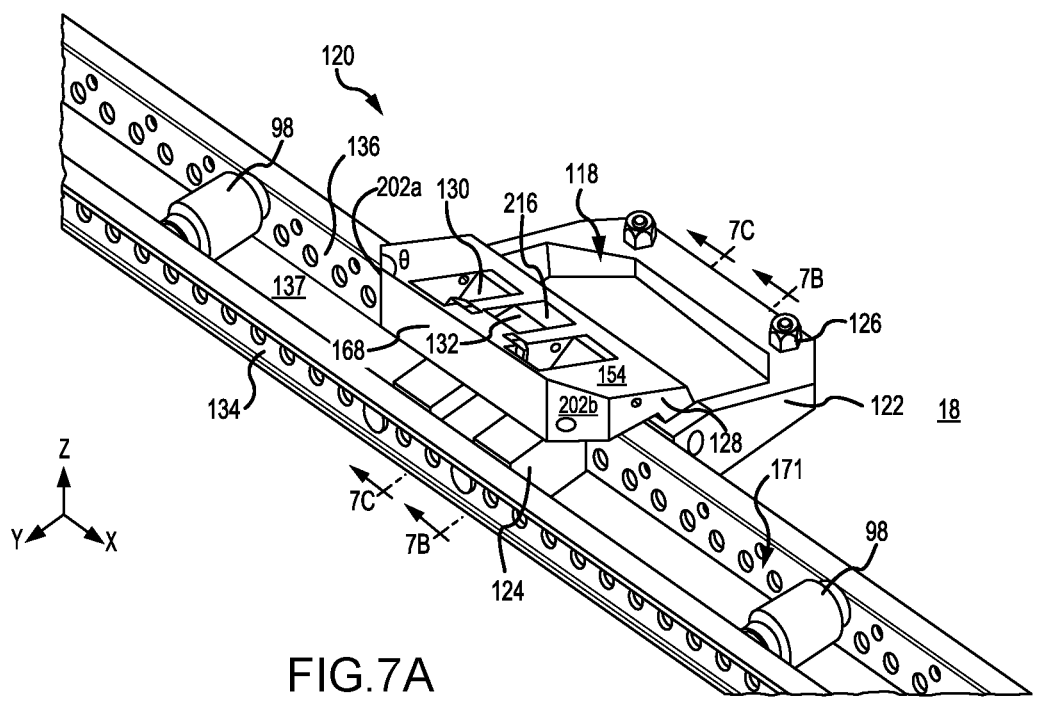
FIG. 7A illustrates an axonometric view of a stowable cargo guide mounted to a roller tray and in a raised position, in accordance with various embodiments.

With additional reference to FIG. 5, stowable cargo guide 110 further includes a guide block 128. In the stowed position, guide block 128 may be located in a block opening 118 defined by housing 122. Guide block 128 is configured to rotate relative to housing 122. In various embodiments, a shaft 150 may be located through guide block 128 and housing 122. Shaft 150 may facilitate rotation of guide block 128 between the stowed position (FIG. 3) and the raised position (FIG. 7A). In various embodiments, guide block 128 may be biased toward the stowed position. For example, one or more torsion springs 152 may bias guide block 128 toward the stowed position. Stated differently, torsion springs 152 may bias guide block 128 in a circumferential direction C2 (FIG. 6A). In the stowed position, a first surface 154 of guide block 128 may be oriented toward the floor (i.e., toward cargo deck 18) and a second surface 156 of guide block 128 may be oriented away from cargo deck 18. Second surface 156 is oriented generally away from first surface 154. In the raised position, first surface 154 of guide block 128 may be oriented away from cargo deck 18 and second surface 156 may be oriented toward cargo deck 18 and the floor 137 of roller tray 94.

Figure 8A:
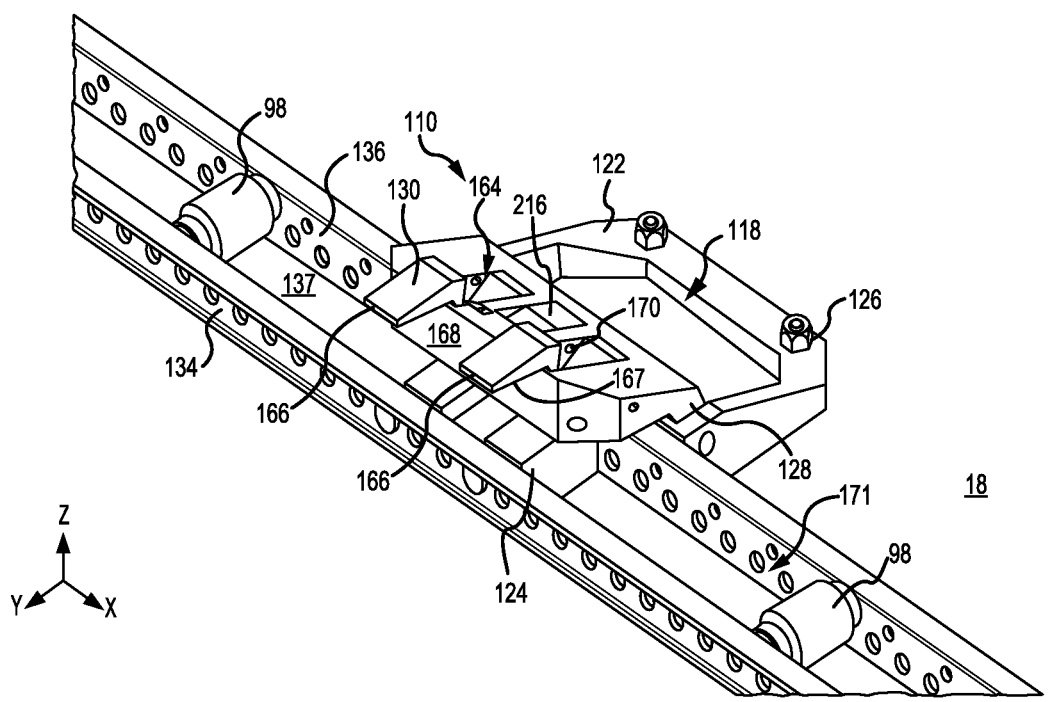
FIGS. 8A and 8B illustrate axonometric views of a stowable cargo guide mounted to a roller tray and in the raised position with the vertical restraints of the stowable cargo guide in a deployed position, in accordance with various embodiments.
Figure 8B:
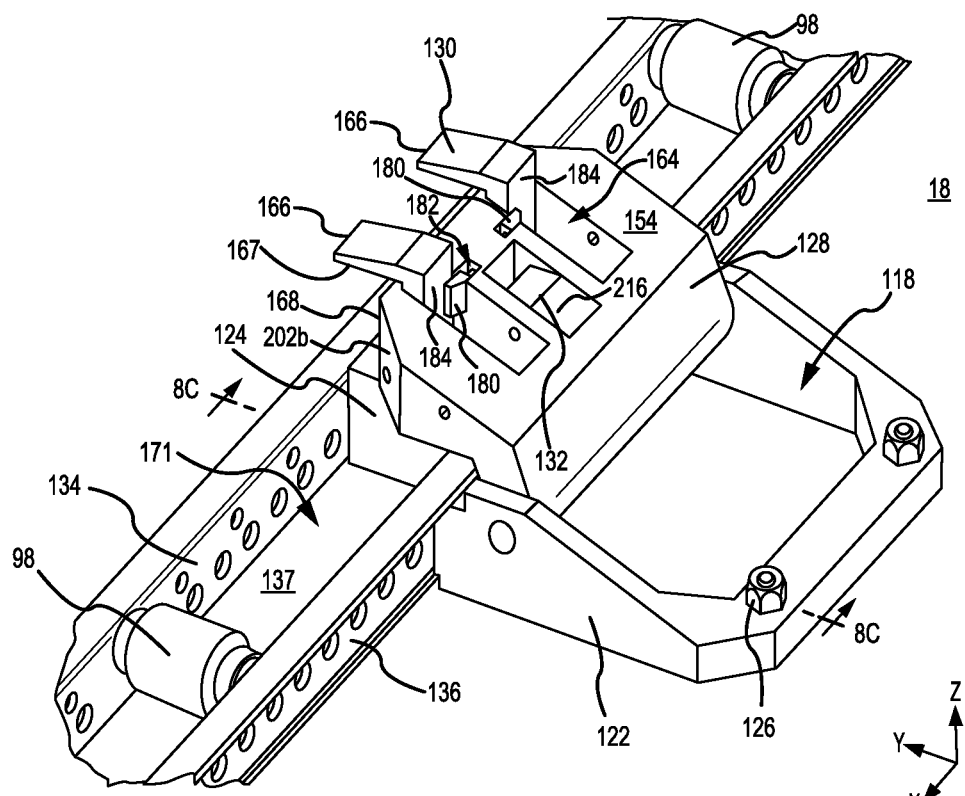
Figure 8C:
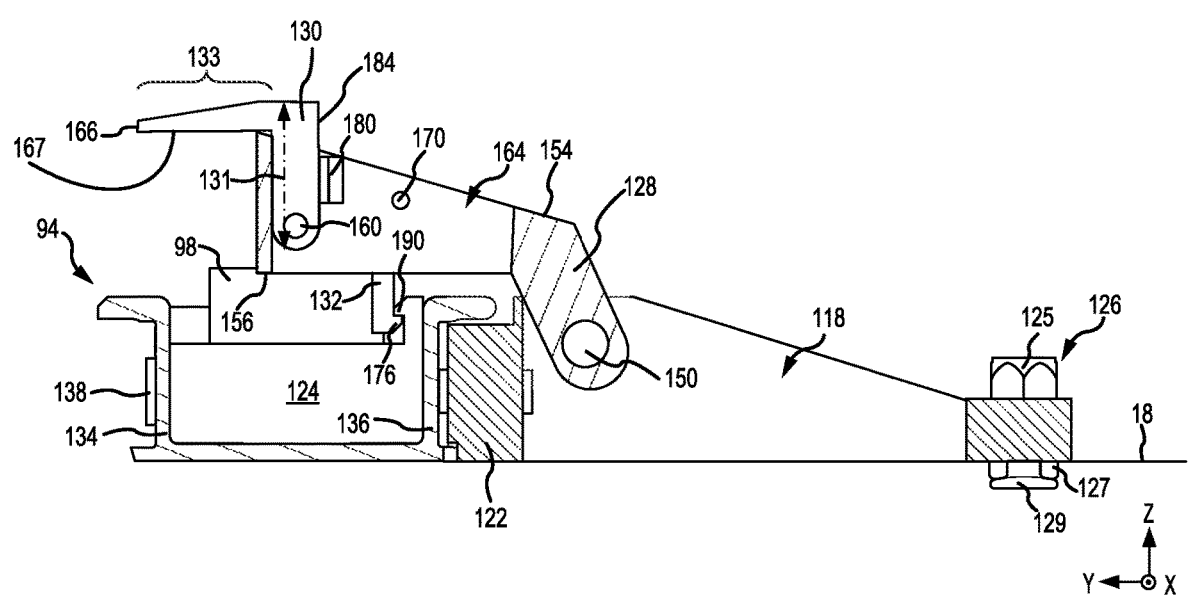
FIG. 8C illustrates a cross-section view, taken along the line 8C-8C in FIG. 8B, of a stowable cargo guide mounted to a roller tray and in the raised position portion with the vertical restraints of the stowable cargo guide in a deployed position, in accordance with various embodiments.

In accordance with various embodiments, stowable cargo guide 110 further includes one or more vertical restraint(s) 130. Vertical restraints 130 are configured to rotate relative to guide block 128. In various embodiments, vertical restraints 130 may be generally "L-shaped". In this regard, vertical restraints 130 may include a first portion 131 and second portion 133 extending from first portion 131. In the deployed position (FIG. 8C), first portion 131 may extend in a generally vertical direction and second portion 133 may extend laterally from first portion 131. In various embodiments, a shaft 160 may be located through a shaft hole 161 defined by guide block 128 and a shaft hole 163 defined by vertical restraint 130. Shaft 160 may facilitate rotation of vertical restraints 130 between the non-deployed position (FIGS. 3 and 7A) and the deployed position (FIGS. 8A, 8B, and 8C). In various embodiments, vertical restraints 130 may be biased toward the non-deployed position. For example, one or more torsion springs 162 may bias vertical restraints 130 toward the non-deployed position. Stated differently, torsion springs 162 may bias vertical restraints 130 in circumferential direction C2 (FIG. 6A). In the non-deployed position, vertical restraints 130 may be located in restraint openings 164 defined by guide block 128. In the deployed position, an end 166 of vertical restraints 130 may extend laterally beyond a guide face 168 of guide block 128. In various embodiments, cargo 102 in FIG. 2B may have a groove configured to receive end 166 of deployed vertical restraints 130. Locating end 166 in the groove defined by cargo 102 may restrict vertical movement of cargo 102. In this regard, in the deployed position, the radially inward facing surface 167 of vertical restraint 130 may contact the surface of the cargo 102 to react vertical loads and/or generate a reaction force against cargo 102, thereby blocking and/or reducing vertical translation of cargo 102.

In various embodiments, torsion springs 162 may be configured to bias end 166 of vertical restraints 130 circumferentially away from guide face 168 of guide block 128. Stowable cargo guide 110 may include one or more restraint latches 180. Restraint latches 180 are located, at least partially, in latch channels 182 defined by guide block 128. Restraint latches 180 may be biased toward restraint openings 164 (e.g., in a longitudinal direction, parallel to the axis of rotation of vertical restraints 130). Restraint latches 180 may be configured to maintain vertical restraints 130 in the deployed position. For example, when vertical restraints 130 are in the deployed position, restraint latches 180 may generate a reaction force against a surface 184 of vertical restraints 130, thereby blocking vertical restraints 130 from rotating to the non-deployed position.

In various embodiments, stowable cargo guide 110 may further include a securement clip 132. Securement clip 132 may be located in a clip opening 148 defined by guide block 128. In various embodiments, securement clip 132 may be located between restraint openings 164. Securement clip 132 is configured to rotate relative to guide block 128. In various embodiments, a shaft 170 may be located through a shaft hole 172 defined by guide block 128 and a shaft hole 174 defined by securement clip 132. Shaft 170 may facilitate rotation of securement clip 132 relative to guide block 128. As discussed in further detail below, securement clip 132 may be configured to engage tray base 124 to secure guide block 128 in the raised position. In various embodiments, a hook end 176 of securement clip 132 may be biased toward tray base 124. For example, one or more torsion springs 178 may bias hook end 176 of securement clip 132 toward a laterally extending protrusion 190, with momentary reference to FIG. 6A, of tray base 124. Stated differently, torsion springs 178 bias hook end 176 of securement clip 132 in a first circumferential direction C1, with momentary reference to FIG. 7C, toward laterally extending protrusion 190 of tray base 124.

Figure 6B:
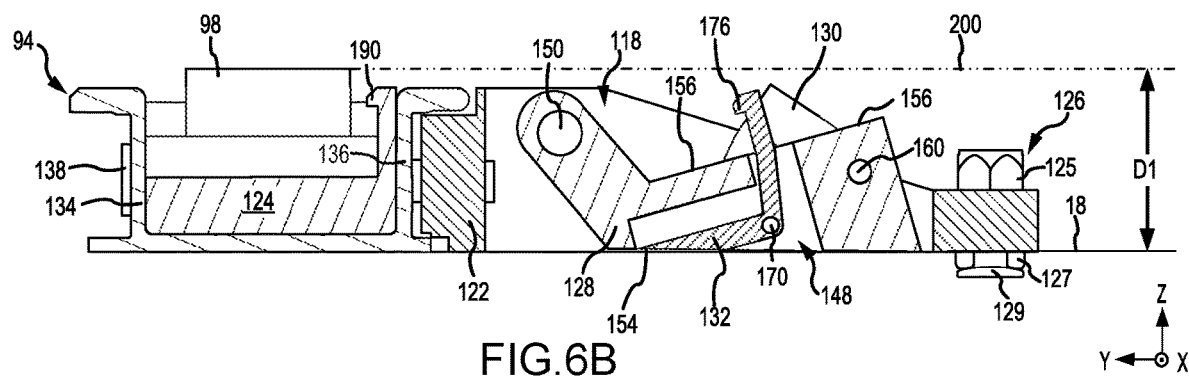

With reference to FIGS. 6A and 6B, cross-section views of stowable cargo guide 110 taken along the lines 6A-6A and 6B-6B, respectively, in FIG. 3, are illustrated with stowable cargo guide 110 in the stowed position and vertical restraints 130 in the non-deployed position. In accordance with various embodiments, in the stowed position, guide block 128 is located in block opening 118 and first surface 154 of guide block is oriented toward cargo deck 18. In the stowed position, guide face 168 of guide block 128 is distal to roller tray 94 and shaft 150 is located laterally between roller tray 94 and guide face 168. In the non-deployed position, end 166 of vertical restraint 130 may be located in restraint opening 164. Stated differently, in the non-deployed position, end 166 of vertical restraint 130 may be positioned between first surface 154 and second surface 156 of guide block 128. Stated yet another way, in the non-deployed position, shaft 160 is located between end 166 of vertical restraint 130 and guide face 168 of guide block 128.

In accordance with various embodiments, hook end 176 of securement clip 132 extends beyond (i.e., protrudes from) second surface 156 of guide block 128. In the stowed position, hook end 176 of securement clip 132 may be oriented away from cargo deck 18 with shaft 170 positioned vertically between hook end 176 and cargo deck 18 and/or vertically between hook end 176 and first surface 154 of guide block 128.

In accordance with various embodiments, stowable cargo guide 110 is configured such that the components of stowable cargo guide 110 (e.g., housing 122, tray base 124, guide block 128, vertical restraints 130, and securement clip 132) are each located below the conveyance plane 200 of roller 98. As used herein, the term "the conveyance plane" refers to a horizontal plane (i.e., an xy-plane perpendicular to the z-axis) tangent to the point on roller 98 that is farthest from cargo deck 18 and floor 137 of roller tray 94. In this regard, housing 122, tray base 124, guide block 128, vertical restraints 130, and securement clip 132 are each located between conveyance plane 200 and cargo deck 18. Stated differently, the vertical height of housing 122, of tray base 124, of guide block 128, of vertical restraints 130, and of securement clip 132 is less than the distance D1 between conveyance plane 200 and cargo deck 18. In this regard, when stowable cargo guide 110 is in the stowed position, housing 122, tray base 124, guide block 128, vertical restraints 130, and securement clip 132 do not contact cargo located on roller 98 and/or traveling along conveyance plane 200.

Figure 7B:
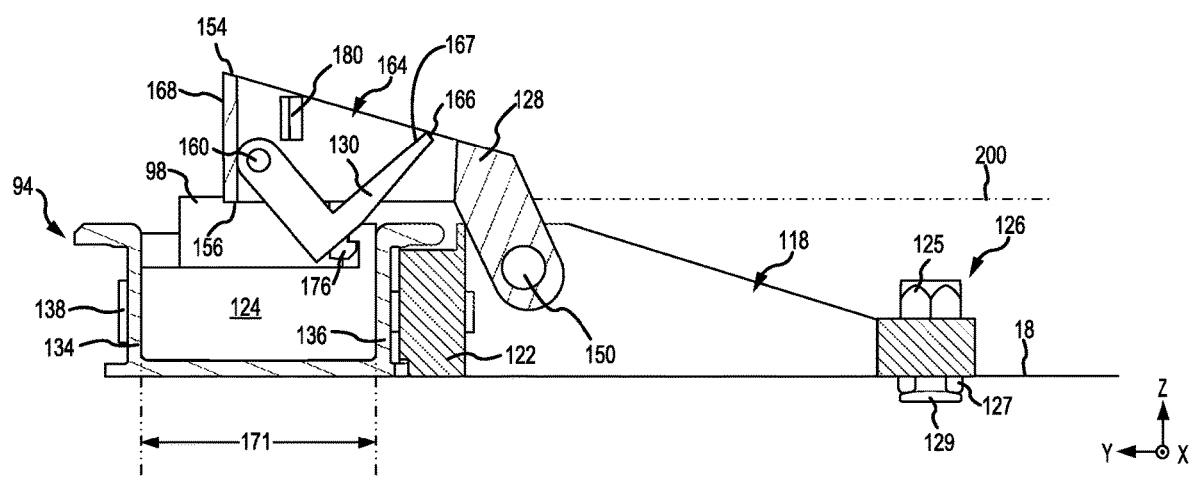
FIGS. 7B and 7C illustrate cross-section views, taken along the lines 7B-7B and 7C-7C, respectively, in FIG. 7A, of a stowable cargo guide mounted to a roller tray and in a raised position, in accordance with various embodiments.
Figure 7C:
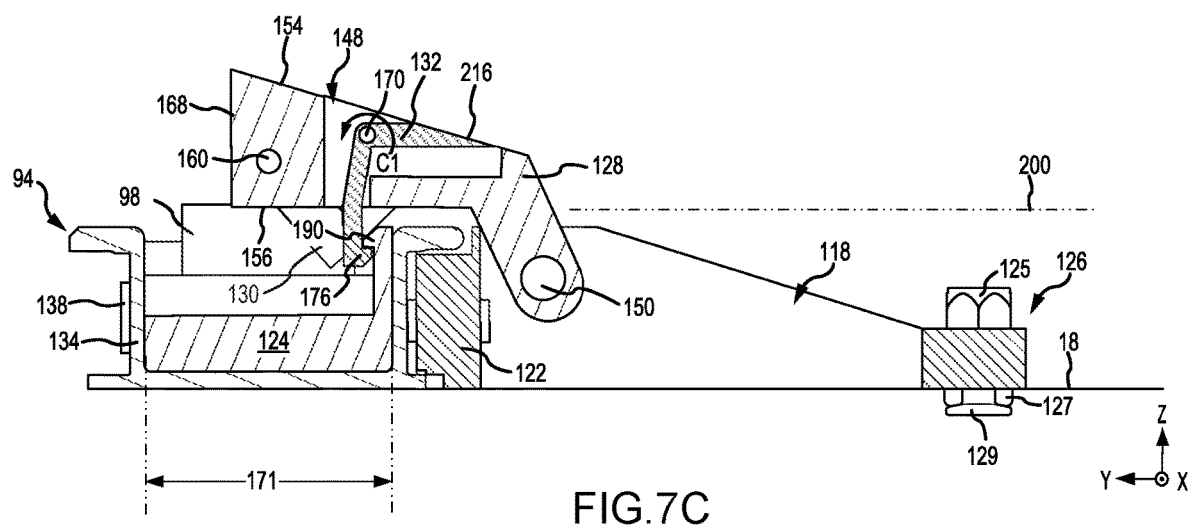

With reference to FIGS. 7A, 7B, and 7C, stowable cargo guide 110 is illustrated in the raised position with vertical restraints 130 in the non-deployed position. In accordance with various embodiments, stowable cargo guide 110 may be rotated from the stowed position (FIG. 3) to the raised position by rotating guide block 128 relative to housing 122. In various embodiments, guide block 128 may pivot about shaft 150. In the raised position, first surface 154 of guide block is oriented away from cargo deck 18 and second surface 156 is oriented toward cargo deck 18 and floor 137 of roller tray 94. In the raised position, guide face 168 of guide block 128 may vertically overlap a volume 171 defined by first rail 134 and second rail 136 of roller tray 94. In accordance with various embodiments, rollers 98 are located in the volume 171 between first rail 134 and second rail 136. In the raised position, second rail 136 of roller tray 94 may be located laterally between guide face 168 and shaft 150. In various embodiments, guide block 128 may include slanted surfaces 202a and 202b. Slanted surfaces 202a, 202b may extend from guide face 168. Slanted surfaces 202a and 202b are oriented at a non-normal angle relative to guide face 168. For example, in various embodiments, an angle theta (θ) formed by guide face 168 and slanted surface 202a is greater than 90°. In various embodiments, angle theta (θ) may be between 91° and 179°. In various embodiments, angle theta (θ) may be between 100° and 150°. In accordance with various embodiments, the angle formed by guide face 168 and slanted surface 202b is equal to angle theta (θ). Slanted surfaces 202a, 202b may be configured to align cargo that is laterally misaligned. In this regard, cargo may shift in the lateral direction as the cargo translates along slanted surface 202a or slanted surface 202b toward guide face 168.

In various embodiments, in the raised position, vertical restraints 130 remain in the non-deployed position, such that end 166 of vertical restraint 130 is located in restraint opening 164. In this regard, end 166 of vertical restraint 130 may be positioned between first surface 154 and second surface 156 of guide block 128 when guide block 128 is in the raised position.

In accordance with various embodiments, in the raised position, securement clip 132 may be oriented toward cargo deck 18 such that hook end 176 is positioned vertically between shaft 170 and cargo deck 18 and/or such that second surface 156 of guide block 128 is positioned vertically between hook end 176 of securement clip 32 and shaft 170.

In accordance with various embodiments, hook end 176 of securement clip 132 is configured to engage laterally extending protrusion 190 of tray base 124, when stowable cargo guide 110 is in the raised position. For example, stowable cargo guide 110 may be rotated (e.g., by an operator) to the raised position by rotating guide block 128 about shaft 150. As guide block 128 is rotated about shaft 150, second surface 156 of guide block 128 and hook end 176 of securement clip 132 rotate toward laterally extending protrusion 190 of tray base 124. In response to the rotation of guide block 128, hook end 176 contacts laterally extending protrusion 190. In response to the force applied (e.g., by the operator) to guide block 128 exceeding the biasing force of torsion springs 178 (FIG. 5), securement clip 132 rotates in a second circumferential direction, opposite first circumferential direction C1 and hook end 176 rotates away from laterally extending protrusion 190. In response to hook end 176 clearing (i.e., moving away from, without contact or substantial contact) laterally extending protrusion 190, securement clip 132 rotates in first circumferential direction C1 and hook end 176 rotates toward second rail 136. In this regard, torsion springs 178 biases hook end 176 toward second rail 136 and housing 122, in response to hook end 176 translating to a position that is vertically offset from laterally extending protrusion 190. In accordance with various embodiments, securement clip 132 may be biased in first circumferential direction C1 and guide block 128 and vertical restraints 130 may be biased in second circumferential direction C2 (FIG. 6A).

A reaction force generated between hook end 176 and laterally extending protrusion 190 tends to prevent guide block 128 from rotating to the stowed position. In this regard, the reaction force generated between hook end 176 and laterally extending protrusion 190 may be greater than the force applied by torsion springs 152 (FIG. 5). To return guide block 128 to the stowed position, a force may be applied (e.g., by an operator) to a back surface 216 of securement clip 132. Securement clip 132 rotates in the second circumferential direction C2, in response to the force applied to back surface 216 exceeding the biasing force applied by torsion springs 178, thereby removing the interference between hook end 176 and laterally extending protrusion 190 and allowing the biasing force applied by torsion springs 152 to rotate guide block 128 about shaft 150.

In accordance with various embodiments, stowable cargo guide 110 is configured such that in the raised position, guide block 128 is located above the conveyance plane 200 of roller 98. In this regard, conveyance plane 200 is located vertically between guide block 128 and cargo deck 18, when stowable cargo guide 110 is in the raised position. When stowable cargo guide 110 is in the raised position, guide block 128 may contact cargo 102 (FIG. 2B) located over cargo deck 18 to guide the longitudinal translation and/or restrict the lateral translation of cargo 102.

With reference to FIGS. 8A, 8B, and 8C, stowable cargo guide 110 is illustrated in the raised position with vertical restraints 130 in the deployed position. In accordance with various embodiments, vertical restraints 130 may be rotated from the non-deployed position (FIGS. 3 and 7A) to the deployed position by rotating vertical restraints 130 relative to guide block 128. In various embodiments, vertical restraints 130 may pivot about shaft 160. In the deployed position, end 166 of vertical restraint 130 is located outside restraint opening 164. In the deployed position, guide block 128 is located vertically between vertical restraints 130 and tray base 124. In the deployed position, end 166 may extend laterally from guide face 168 of guide block 128 such that guide face 168 is located laterally between end 166 of vertical restraints 130 and shaft 160. Vertical restraints 130 extending laterally beyond guide face 168 tends to allow vertical restraints 130 to be located within grooves defined by cargo 102 (FIG. 2B). The longitudinal distance between vertical restraints 130 may be selected to increase a likelihood that at least one of the vertical restraints 130 will contact cargo 102, thereby restricting vertical translation of cargo 102.

Torsion springs 162 (FIG. 5) may be configured to bias vertical restraints 130 toward the non-deployed position. In this regard, vertical restraints 130 may be rotated to the deployed position, in response a force being applied (e.g., by an operator) to vertical restraints 130 that is greater than the biasing force of torsion springs 162. Vertical restraints 130 may be maintained in the deployed position by restraint latches 180. In the deployed position, at least a portion of vertical restraints 130 is located between guide face 168 of guide block 128 and restraint latches 180. In this regard, restraint latches 180 generate a reaction force with surface 184 of vertical restraints 130, thereby preventing vertical restraints 130 from rotating to the non-deployed position.

In accordance with various embodiments, vertical restraints 130 may be rotated (e.g., by an operator) to the deployed position by rotating vertical restraints 130 about shaft 160. As vertical restraints 130 rotate, vertical restraints 130 rotate circumferentially toward restraint latches 180 and guide face 168 of guide block 128. In response to the rotation of vertical restraints 130, vertical restraints 130 contact restraint latches 180. In response to the force applied (e.g., by an operator) to vertical restraints 130 exceeding the biasing force applied to restraint latches 180, restraint latches 180 translate longitudinally into latch channels 182. In response to surface 184 of vertical restraints 130 clearing (i.e., moving away from, without contact or substantial contact) restraint latches 180, restraint latches 180 translate out latch channels 182, thereby generating a reaction force with surface 184 that prevents vertical restraints 130 from rotating to the non-deployed position. In this regard, the interference between surface 184 and restraint latches 180, prevents the biasing force applied by torsion springs 162 (FIG. 5) from rotating vertical restraints 130 to the non-deployed position. To return vertical restraints 130 to the non-deployed position, a force may be applied (e.g., by an operator) to restraint latches 180, thereby forcing restraint latches 180 into latch channels 182 and removing the interference between surface 184 and restraint latches 180. Removing the interference between surface 184 and restraint latches 180 allows the biasing force of torsion springs 162 to rotate vertical restraints 130 about shaft 160. In various embodiments, an actuation device may be operably coupled to restraint latches 180. The actuation device may be configured to translate restraint latches 180 into latch channels 182, in response to guide block 128 rotating from the raised position to the stowed position (e.g., in response to rotation of guide block 128 about shaft 150 and into block opening 118). In this regard, the actuation device may reduce occurrences of vertical restraints 130 being in the deployed position, when guide block 128 is in the stowed position.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A stowable cargo guide, comprising:
   a housing;
   a guide block located in a block opening defined by the housing and configured to rotate relative to the housing;
   a first vertical restraint located in a first restraint opening defined by the guide block and configured to rotate relative to the guide block;
   a securement clip located in a clip opening defined by the guide block and configured to rotate relative to the guide block; and
   a tray base including a laterally extending protrusion configured to engage a hook end of the securement clip.

2. The stowable cargo guide of claim 1, wherein the securement clip is biased in a first circumferential direction and the first vertical restraint is biased in a second circumferential direction opposite the first circumferential direction.

3. The stowable cargo guide of claim 2, wherein the guide block is biased in the second circumferential direction, and wherein engagement between the hook end of the securement clip and the laterally extending protrusion of the tray base restricts rotation of the guide block in the second circumferential direction.

4. The stowable cargo guide of claim 1, further comprising a first restraint latch located in a first latch channel defined by the guide block and biased toward the first restraint opening.

5. The stowable cargo guide of claim 4, further comprising:
   a second vertical restraint located in a second restraint opening defined by the guide block and configured to rotate relative to the guide block; and
   a second restraint latch located in a second latch channel defined by the guide block and biased toward the second restraint opening.

6. The stowable cargo guide of claim 5, wherein the securement clip is located between the first restraint opening and the second restraint opening.

7. A cargo handling system, comprising:
   a roller tray including a first rail, a second rail, and a roller located between the first rail and the second rail; and
   a stowable cargo guide coupled to the roller tray, the stowable cargo guide comprising:
      a tray base located between the first rail and the second rail;
      a housing coupled to the second rail;

a guide block located in a block opening defined by the housing and configured to rotate relative to the housing;

a vertical restraint located in a restraint opening defined by the guide block and configured to rotate relative to the guide block; and a securement clip located in a clip opening defined by the guide block and configured to rotate relative to the guide block, wherein the tray base includes a laterally extending protrusion configured to engage a hook end of the securement clip.

8. The cargo handling system of claim 7, wherein the guide block is configured to rotate between a stowed position and a raised position, and wherein in the stowed position the guide block is located below a conveyance plane of the roller, and wherein in the raised position the guide block is located above the conveyance plane of the roller.

9. The cargo handling system of claim 8, wherein in the raised position a guide face of the guide block vertically overlaps a volume defined by the first rail and the second rail of the roller tray.

10. The cargo handling system of claim 7, wherein the securement clip is biased in a first circumferential direction and the guide block is biased in a second circumferential direction opposite the first circumferential direction.

11. The cargo handling system of claim 10, wherein the vertical restraint is biased in the second circumferential direction.

12. The cargo handling system of claim 11, wherein the stowable cargo guide further comprises a restraint latch located in a latch channel defined by the guide block, and wherein the restraint latch is biased toward the restraint opening.

13. The cargo handling system of claim 8, wherein the stowable cargo guide further comprises a shaft located through the guide block and the housing, and wherein in the stowed position the shaft is located laterally between the second rail and a guide face of the guide block.

14. The cargo handling system of claim 13, wherein the guide block comprises a slanted surface extending from the guide face of the guide block, and wherein the slanted surface and the guide face form an angle greater than 90°.

15. A stowable cargo guide, comprising:

a housing;

a guide block located in a block opening defined by the housing and configured to rotate relative to the housing;

a first vertical restraint located in a first restraint opening defined by the guide block and configured to rotate relative to the guide block;

a securement clip located in a clip opening defined by the guide block and configured to rotate relative to the guide block; and a first restraint latch located in a first latch channel defined by the guide block and biased toward the first restraint opening.

16. The stowable cargo guide of claim 15, further comprising:

a second vertical restraint located in a second restraint opening defined by the guide block and configured to rotate relative to the guide block; and a second restraint latch located in a second latch channel defined by the guide block and biased toward the second restraint opening.

17. The stowable cargo guide of claim 16, wherein the securement clip is located between the first restraint opening and the second restraint opening.

18. The stowable cargo guide of claim 15, wherein the securement clip is biased in a first circumferential direction and the first vertical restraint is biased in a second circumferential direction opposite the first circumferential direction.

* * * * *